United States Patent [19]

Tolley

[11] 4,258,893

[45] Mar. 31, 1981

[54] SUPPORTING MATERIAL FOR COPYING

[76] Inventor: Michael L. Tolley, 1370 Broadway, W. Somerville, Mass. 02144

[21] Appl. No.: 891,075

[22] Filed: Mar. 29, 1978

[51] Int. Cl.[3] .......... F16M 13/00

[52] U.S. Cl. .......... 248/441 B; 248/214; 248/1; 108/28

[58] Field of Search .......... 248/214, 215, 317, 340, 248/341, 441 R, 441 A, 441 B, 489, 495, 451, 452, 453; 108/28, 29, 30, 32; 24/3 M; 211/32, 113

[56] References Cited

U.S. PATENT DOCUMENTS

| | | | |
|---|---|---|---|
| 980,162 | 12/1910 | Meyer | 248/215 X |
| 1,178,237 | 4/1916 | Keating | 248/441 B X |
| 2,006,887 | 7/1935 | Doherty | 248/451 |
| 3,341,242 | 12/1967 | Carson | 211/113 X |
| 4,068,817 | 1/1978 | Berger | 248/340 |

FOREIGN PATENT DOCUMENTS

| | | | |
|---|---|---|---|
| 860540 | 10/1952 | Fed. Rep. of Germany | 211/113 |
| 35391 | 5/1912 | Sweden | 248/317 |

*Primary Examiner*—William H. Schultz
*Attorney, Agent, or Firm*—Charles Hieken

[57] ABSTRACT

A bracket defining an inverted channel for sliding engagement with a top edge of a drafting board is formed with a depending lip extending outward from the drafting board and an opening for accommodating a flexible cord attached at its other end to a spring-loaded clip for gripping the top edge of an input sheet having information to be transferred to a formal drawing attached to the drafting board.

7 Claims, 2 Drawing Figures

SUPPORTING MATERIAL FOR COPYING

BACKGROUND OF THE INVENTION

The present invention relates in general to drafting and more particularly concerns novel apparatus and techniques for holding rough input material to be reproduced by a draftsman in a formal drawing in a manner that facilitates copying by the draftsman while reducing fatigue, facilitating drafting anywhere on the formal sheet and minimizing undesired blemishes.

The typical prior art approach to preparing formal drawings involves taping both the formal sheet and the informal sheet, usually containing a rough sketch of the material to be copied, to the drafting board. Usually the informal input sheet is considerably smaller than the formal sheet and frequently contains material on both sides. Not infrequently the draftsman must work on the formal sheet on a location spaced so far from the informal input sheet that he must move back and forth between the two locations, increasing the time for completing the work and fatigue. Alternatively, the draftman may tape the input sheet to the formal sheet near the location where he is then working, moving the informal input sheet from time to time. Not only is this time consuming, but removing the tape introduces undesired wrinkles or warps in the formal sheet and the sticky residue of tape may attract contaminants leaving undesired blemishes on the formal sheet. And obtaining access to both sides of the informal input sheet requires at least one untaping and retaping.

There is still another disadvantage of the prior art approach. The draftsman uses mutually perpendicular rules adjustable in angle and position along the entire drafting table. An informal input sheet taped to the formal sheet may interfere with movement of the rules. In moving these rules the draftsman may inadvertently poke the rule between the informal sheet and the formal sheet, thereby dislodging the informal sheet and perhaps introducing a gouge in the formal sheet below. Furthermore, adhesive material from the tape may stick to the rule interfering with its free movement along the formal drafting sheet.

It is an important object of the invention to provide improved methods and means for supporting informal input drafting material.

It is a further object of the invention to achieve the preceding object while overcoming one or more of the disadvantages enumerated above.

It is a further object of the invention to achieve one or more of the preceding objects with apparatus that is relatively inexpensive and easy to fabricate.

It is a further object of the invention to achieve one or more of the preceding objects with apparatus that is convenient to use by draftsmen.

It is still another object of the invention to achieve one or more of the preceding objects with apparatus capable of being used on virtually any drafting board and adaptable for use with a wide variety of formal drawing sizes.

SUMMARY OF THE INVENTION

According to the invention, there is support means defining a channel for sliding engagement with the top of a drafting board, clamping means for detachably engaging the top edge of input drafting material to be copied on a formal sheet, and twistable coupling means intercoupling said support means and said clamping means for allowing input material engaged by said clamping means to be supported with either side exposed to the draftsman copying the material.

The method according to the invention includes placing the support means over the top edge of the drafting board, attaching the clamping means to the top edge of the input material and positioning the support means so that the input material is adjacent to the portion of the formal sheet where the draftman is to copy material from the input sheet upon the formal sheet.

Numerous other features, objects and advantages of the invention will become apparent from the following specification when read in connection with the accompanying drawing in which:

DETAILED DESCRIPTION OF PREFERRED EMBODIMENTS

Figure 1:
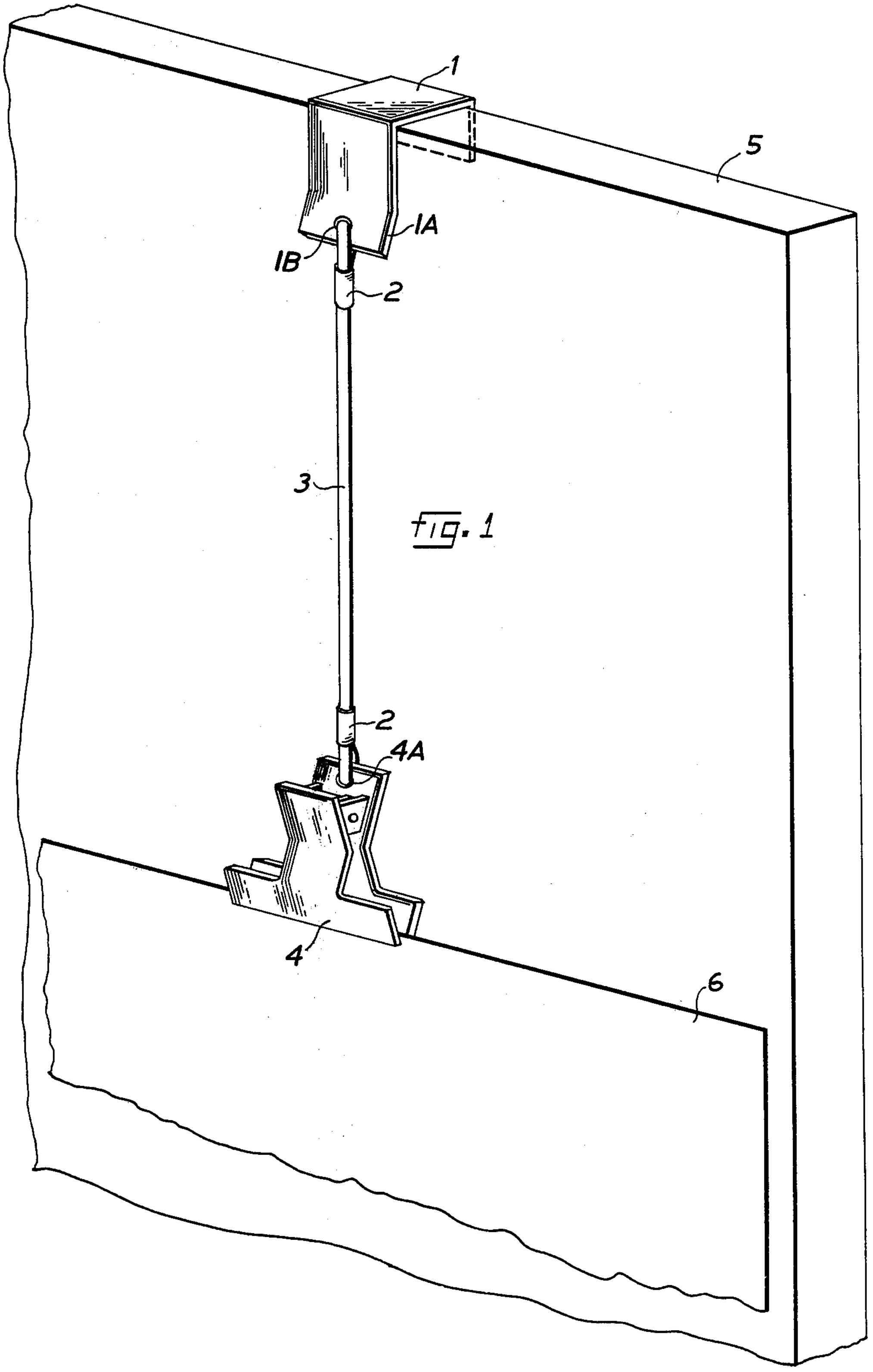
FIG. 1 is a perspective view of an embodiment of the invention with portions cut away illustrating how informal input material to be copied is conveniently supported from the top edge of a drafting board.

Referring to FIG. 1, there is shown a perspective view of an embodiment of the invention with portions cut away. The invention comprises support means 1 having a depending lip 1A extending outward from the drafting board and formed with an opening 1B for accommodating cord 3 so that the cord is clear of the drafting board beneath. Each end of cord 3 is fastened to the standing portion of cord 3 by sleeves 2, which may be taped, or alternatively, sleeves 2 may comprise elastic material or other type of fastener that allows the end of cord 3 to be pulled through so as to facilitate adjustment of the effective length of cord 3. As still a further alternative the assembly may be fabricated with cords 3 of different lengths for different desired positions of input material 6. As still a further alternative, one or both of support 1 and clip 4 may be formed with cleats or other suitable means about which portions of cord 3 may be wrapped to adjust the length as desired.

Clip 4 is formed with an opening 4A for accommodating cord 3 and may comprise a conventional spring clip or other suitable fastening means for detachably securing the top edge of input material 6 to the assembly.

Figure 2:
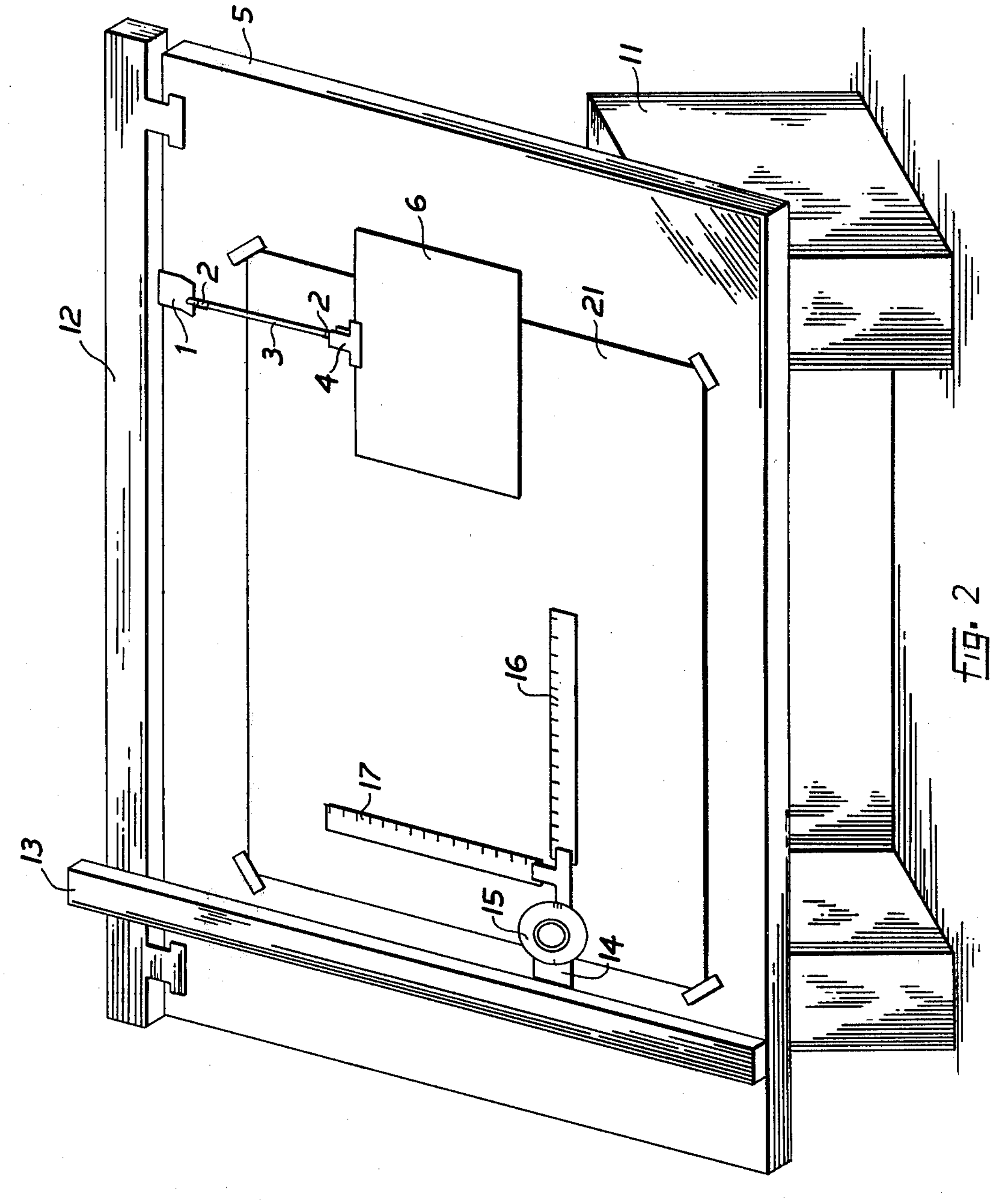
FIG. 2 is a perspective view of a typical drafting board showing the relationship between the input material supported according to the invention and the formal sheet.

Referring to FIG. 2, there is shown a perspective view of the invention being used on a typical drafting board 5. The same reference symbols identify corresponding elements throughout the drawing. Drafting board 5 rests on a support assembly 11 and carries a rule assembly comprising a horizontal support member 12 that clamps to the top of board 5 while leaving a gap, typically about an inch, through which support member 1 may be inserted and thereby allowing the assembly according to the invention to position input material 6 anywhere horizontally along the board as support member 1 slides horizontally. The rule assembly also includes a vertical member 13, a horizontal stub 14 to which angle adjusting knob 15 is attached that carries mutually perpendicular rules 16 and 17 in a conventional known manner so that the angular position of rules 16 and 17 may be adjusted about the axis of knob 15, the vertical position adjusted by moving stub 14 and the horizontal position adjusted by moving member 13 in a known manner. Formal sheet 21 is taped to drafting board 5.

In practicing the invention attach clip 4 to the top of input material 6, place support member 1 over the top edge of drawing board 5, and position the assembly so that the information on input material 6 is exposed to the draftsman and input material 6 is located near the portion of formal sheet 21 where this particular information is to be inscribed by the draftsman.

The invention has a number of important advantages when compared with the prior art approach of taping input sheet 6 to formal sheet 21. Attachment is quick and easy. Sheet 6 may be rapidly and readily reversed so that both sides may be exposed to the draftsman for copying. Input sheet 6 may be positioned virtually anywhere along the board close to the portion of the formal sheet where the draftsman is inscribing quickly. Sheet 6 does not interfere with the positioning of the rule assembly. The absence of taping and untaping helps minimize the appearance of undesired wrinkles or warps in formal sheet 21 and attracting undesired blemishes on the sheet or contaminating the rules with tacky material. The invention provides these benefits with a structure that is relatively inexpensive to fabricate and easy to use.

There has been described novel apparatus and techniques for displaying input material to be copied on a formal sheet by a draftsman. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for supporting input material to be copied on a formal sheet on a drafting board comprising, said drafting board, support means for engaging and slidably adjustable along the top edge of said drafting board, fastening means for detachable engagement with the top edge of input material to be copied, said support means for allowing said fastening means to be located at a point on said drafting board at substantially any distance between the side edges of said drafting board, said fastening means resting against the front face of said drafting board which face is arranged to support a sheet for receiving graphical information related to said input material, and twistable means intercoupling said support means and said fastening means depending from said support means for supporting said fastening means at a predetermined distance from the top edge of said drafting board while allowing said fastening means to be rotated so that input material fastened thereby may be readily positioned with either side exposed for copying.

2. Apparatus in accordance with claim 1 wherein said support means comprises a bracket defining an inverted channel for sliding engagement with the top edge of said drafting board.

3. Apparatus in accordance with claim 2 wherein said bracket means is formed with a depending lip extending outward from said drafting board and formed with an opening for accommodating said twistable means.

4. Apparatus in accordance with claim 3 wherein said twistable means comprises a flexible cord.

5. Apparatus in accordance with claim 4 wherein said fastening means comprises a spring-loaded clip.

6. A method of using the apparatus of claim 1 which method includes the steps of placing the support means over the top edge of said drafting board, attaching said fastening means to the top edge of input material to be copied, and positioning the assembly comprising said support means, said fastening means, said flexible means and the input material with the input material adjacent to a portion of a formal sheet attached to said drafting board where material exposed on said input material is to be copied by a draftsman.

7. Apparatus in accordance with claim 1 and further comprising said input material having its top edge engaged by said fastening means.

* * * * *